United States Patent [19]

Wetzel

[11] 4,366,176
[45] Dec. 28, 1982

[54] PROCESS FOR THE PRODUCTION OF A STRUCTURE PROTEIN PRODUCT

[75] Inventor: Pierre Wetzel, Vevey, Switzerland

[73] Assignee: Societe D'Assistance Technique Pour Produits Nestle S.A., Lausanne, Switzerland

[21] Appl. No.: 244,764

[22] Filed: Mar. 17, 1981

[30] Foreign Application Priority Data

Mar. 31, 1980 [CH] Switzerland .......................... 2522/80

[51] Int. Cl.³ .............................................. A23J 3/00
[52] U.S. Cl. .................................... 426/104; 426/656; 426/657; 426/574; 426/802; 210/321.2; 210/644
[58] Field of Search ............... 426/104, 656, 657, 802, 426/574, 431, 437; 210/321.2, 644

[56] References Cited

U.S. PATENT DOCUMENTS

| | | | |
|---|---|---|---|
| 3,840,671 | 10/1974 | Kim et al. | 426/802 X |
| 3,987,213 | 10/1976 | Hawkins | 426/657 X |
| 3,993,794 | 11/1976 | Bernardin | 426/802 X |
| 4,133,901 | 1/1979 | Fetzer et al. | 426/802 X |
| 4,154,856 | 5/1979 | Akin | 426/802 X |

*Primary Examiner*—Robert A. Yoncoskie
*Attorney, Agent, or Firm*—Vogt & O'Donnell

[57] ABSTRACT

A structured protein product is prepared from a protein material having a three-dimensional organization solely by applying osmotic force. The process comprises exchanging the water in said protein material with an osmotic agent by compacting the protein material in an envelope of semi-permeable material which is closed and then immersed in a solution of osmotic agent.

The product obtained may be used in the production of deep-frozen, preserved or dehydrated food products.

14 Claims, No Drawings

PROCESS FOR THE PRODUCTION OF A STRUCTURE PROTEIN PRODUCT

This invention relates to a process for the production of a structured protein product having a compact texture. This product is obtained from a protein-containing material which already has a three-dimensional organisation, such as for example soya curds or fish fibres.

Various so-called "structuring" or "texturing" processes are known in which visco-elastic properties and above all adequate strength and cohesion are imparted to protein-containing materials. Processes of this type include extrusion which, purely physically and under the combined effect of temperature and pressure, enables a paste containing proteins to be converted into a sufficiently firm cellular material. By chemically coagulating proteins at their iso-electric pH, spinning enables a solution or suspension of proteins to be converted into fibres which may in turn be converted by a series of treatments into meat or fish "analogs".

The present invention provides a new way of structuring or texturing proteins, affording access to products which have a compact texture without having been subjected to a spinning operation. The present invention provides a process for the production of a structured product from a water-containing protein material having a three-dimensional organisation and a pH of at least 4.5 which comprises compacting the protein material in a semipermeable envelope, closing the envelope and exchanging the water present in the protein material for an osmotic agent solely by the application of osmotic force by immersing the closed envelope in a solution of the osmotic agent having a pH of at least 4.5.

By "protein material having a three-dimensional organisation" are meant proteins that have a three-dimensional structure naturally or as the result of a treatment; the term does not include proteins in solution.

Examples of protein materials having a three-dimensional organisation are coagulated products, such as curds, particularly soya curd. This curd, which may have been prepared by coagulation both with calcium and also with glucono-delta-lactone, is preferably a fatty curd, i.e. a curd containing lipids. It is also possible to incorporate in the curd the insoluble fractions which are left after separation of the suspension in the production of soya curd. It is also possible to use other materials which have a three-dimensional organisation without having been subjected to a coagulation process in the accepted sense. Materials such as these include fish fibres, for example fish scraps accumulating as by-products in the filleting or canning of fish.

For the osmotic force to be able to act on and structure the starting protein material, it is advisable for the protein starting material to have a dry matter content of from 5 to 28% and advantageously from 18 to 22% in the case of soya. At the same time, the pH-value of this starting material should also be such that the osmotic force is able to act. In this connection, it has been found that no structuring occurs at pH-values below 4.5. In addition, for organoleptic reasons, pH-values above 9 should be avoided. The advantageous pH-range from the structuring point of view is thus between 6.5 and 7.5.

The exchange between the water and the osmotic agent by osmotic pressure takes place by a mechanism comparable with dialysis or plasmolysis when the protein material is brought into contact with a solution containing an osmotic agent in a high concentration, preferably saturation level, for example salts, polyols or sugars either individually or in the form of a compatible mixture. From now on, the process according to the invention will be described with reference to the preferred osmotic agent represented by calcium ions. It is obvious that it would also be possible to use any osmotic agent mentioned above with comparable results. The solution is preferably a solution of calcium chloride having a concentration of from 35 to 45% by weight or, to a lesser degree, a solution of calcium nitrate having a concentration of from 60 to 70% at ambient temperature (20° to 30° C.).

The contact time should of course be long enough for the exchange to become substantial and to lead to satisfactory structuring. At ambient temperature, this contact time is typically from 1 to 24 hours, depending on the form and dimensions of the structured product and the thickness of the structured layer which it is desired to obtain. It is also possible to work with heating at a temperature in the range from for example 55° to 60° C., in which case structuring is greatly accelerated. It has been found for example that the structure obtained under the effect of the osmotic force over a period of 2 hours at 55° C. is comparable—for the same concentration—with that obtained over a period of 24 hours at ambient temperature. In this case, there are two types of structuring, the one resulting from plasmolysis and the other from coagulation under the effect of heat.

The pH of the solution of calcium ions has the same bearing on structuring as the pH-value of the protein starting material. The pH-values are advantageously in the range from 6.5 to 7.5.

Under the effect of the osmotic force, the water in the protein material is exchanged for calcium ions. The protein material is thus greatly dehydrated during its structuring and takes in calcium ions. Its volume decreases proportionally. Thus, from a starting material having a dry matter content as indicated above, it is possible to obtain a textured product having a dry matter content of up to 75% and a content of calcium ions of 33%, expressed as calcium chloride. These results are obtained after about 24 hours for a 15 to 20 mm thick layer.

The structured product obtained has a calcium content which is generally too high for the applications envisaged. It is therefore of advantage to subject the product to washing with water and, in this way, it is possible to reduce the calcium content to modest values, for example 3% of the dry matter expressed as calcium chloride. Washing may be carried out at ambient temperature over periods of from 15 to 24 hours or even at higher temperatures, for example between 55° to 60° C., over a period of from 8 to 10 hours for a 15 to 20 mm thick layer.

The process according to the invention is very simple to carry out. The protein starting material, for example a soya curd, is advantageously smoothed and then packed into an envelope of semipermeable material, for example a tubular casing of the type used either in dialysis or in sausage-making, or is then introduced between two sheets of the same materials as above to obtain products varying in size and shape. The envelope is then closed and the whole is immersed in a concentrated solution of calcium salt at the desired temperature. The material is then structured, contracting at the same time. For a given dry matter content, a given pH-value of the curd and a given osmotic agent according to the type of membrane and the thickness of the curd, the texture of the structured product is determined by the dialysis time and temperature. The structured product is then withdrawn from the solution of calcium salt. It is then advantageously washed with water to eliminate a large part of the calcium. The washed product is the desired structured product.

This product has some properties which it is particularly appropriate to mention. Thus, contrary to what is generally observed, this product withstands sterilisation particularly well. If placed in an aqueous environment, it does not deform, disintegrate or dissolve. In the same way, this product may be easily frozen and thawed. On the whole, the texture in fact tends to increase in strength during these treatments.

Its taste differs considerably from the taste of the protein starting material. Thus, a product prepared from a soya curd does not have the taste of soya which is a taste which certain Western consumers find unpleasant. The texture obtained may be compared with that of a cooked "mollusc". If the curd contains the insoluble fractions of the soya milk, its texture is rendered less compact and its rehydration properties are improved without its taste being affected. In the same way, a product obtained from fish scraps does not have the taste of fish.

On a nutritional level, this product has the same P.E.R (protein efficiency ratio) as the starting material, i.e. the P.E.R. is not affected by the texturing operation. On the other hand, soya-based products show a considerable reduction in the anti-trypsin factor and the sugars causing flatulence which are obstacles to good digestion and intestinal absorption. The anti-trypsin factor may be reduced to ⅛ and the sugars by 95% by weight.

This product has numerous culinary applications, particularly in dishes which have to be sterilised. It keeps very well in acetic solution (vinegar conserves) and in alcoholic solutions. It may also be used with advantage in deep-frozen or dehydrated form. Alternatively, the product may be stored for a long time in semi-moist form with the osmotic agent still present therein and need only be washed just before it is used. Spices, flavourings or edible colourants may be incorporated in the product, preferably in liposoluble form. It is also possible to incorporate in the curd texturing agents, such as pectins, alginates, etc., or food products of different types in the form of fragments, such as fruit, vegetables or meats to obtain composite products.

The process according to the invention is illustrated by the following Examples in which the percentages quoted represent percentages by weight.

EXAMPLE 1

A semolina of finely ground soya is prepared and then suspended in water in a quantity of 1 part of soya to 7 parts of water. The suspension thus formed is then pasteurised at 110° C., after which the insoluble fractions are eliminated by centrifuging. A curd is prepared from this milk by the addition of calcium salt in a quantity of 3% by weight, based on the dry matter content of the milk. This precipitate is separated by centrifuging and the starting soya curd is thus obtained. It has a dry matter content of 21% by weight, being made up of 60% of proteins and 28% of lipids.

After smoothing, this curd is stuffed into a dialysis membrane 18 mm in diameter by the technique traditionally used for making "Viennese sausages", after which the membrane thus filled with curd is vertically immersed in a glass column inside which a solution of calcium chloride having a concentration of 40% by weight (ionic strength=10.8) and a pH-value around 7 circulates upwards.

Working at ambient temperature, the concentration of the circulating solution is kept constant by the introduction of calcium chloride. The diameter of the "sausages" gradually decreases and the membrane, "having grown too large" folds around the product being structured. Structuring is terminated after about 24 hours.

The tubular casing is cut away, leaving a structured protein product of which the dry matter content has increased to 70% and its calcium chloride content to 33% by weight, based on dry matter.

The product obtained is then liberally washed with water at 10° to 25° C. over a period of 18 hours to bring the calcium chloride content back to 3% by weight, based on dry matter.

The product finally obtained has a dry matter content of from 30 to 40% and is very neutral without any aftertaste of soya. It stands up to sterilisation very well without deformation, disintegration or dissolution of the fragments in aqueous medium, its texture rather tending to increase in strength.

EXAMPLE 2

The procedure is as described in Example 1, except that structuring is carried out by bringing the soya curd into contact with the calcium solution in its tubular casing over a period of only 2 hours at 55° C.

The product obtained has a texture comparable with that of Example 1 before and after washing.

This product, like that of Example 1 has a P.E.R. value of 2.2 which is the same as that of the starting soya curd. On the other hand, the anti-trypsin factor is only 100 units per mg of nitrogen as compared with 260 for the starting soya curd and 800 units for the raw bean. In addition, 92% of the sugars causing flatulence present in the starting bean have been eliminated.

EXAMPLE 3

The procedure is as described in Example 1 except that, after preparation of the curd, between 5 and 25% of the insoluble fractions separated are intimately incorporated therein. After structuring, this will give a range of textures increasing in softness as the level of insoluble fractions incorporated increases. The product stands up well to sterilisation and freezing without any change of taste, the texture increasing in strength without deforming or disintegrating, and rehydrates more readily, the higher the level of insoluble fractions incorporated therein.

EXAMPLE 4

A soya curd is prepared from a suspension containing all the insoluble fractions of the bean (approximately 25%) by the addition of 2.5% of calcium salt, based on the dry matter content of the suspension. Hot water is introduced into the coagulated suspension, after which the curd is separated by centrifuging. The curd has a dry matter content of 21% made up of 55% of proteins and 25% of lipids. After structuring as in Example 1, the product obtained has a soft texture and rehydrates easily.

EXAMPLE 5

The procedure is as described in Example 1 except that the calcium chloride solution is replaced by a 95% glycerol solution. The product is structured over a period reduced to 16 hours and its texture is comparable.

EXAMPLE 6

A 1.5 mm thick structured membrane containing the non-structured curd is formed by plasmolysis for 12 hours. Internal structuring is then obtained by freezing for 48 hours at −40° C. and then for 5 days at −20° C. A product of composite texture is obtained, its centre having a flake-like form.

EXAMPLE 7

The actual structuring operation is carried out in the same way as in Example 1, starting with ground fish scraps.

The structured product obtained is all the more interesting as neither its texture nor its taste is reminiscent of fresh fish.

I claim:

1. A process for the production of a structured product from a water-containing protein material having a three-dimensional organisation and a pH of at least 4.5 which comprises compacting the protein material in a semipermeable envelope, closing the envelope and exchanging the water present in the protein material for an osmotic agent capable of penetrating said semipermeable envelope solely by the application of osmotic force by immersing the closed envelope in a solution of the osmotic agent having a pH of at least 4.5.

2. A process as claimed in claim 1, wherein the starting protein material is a soya curd.

3. A process as claimed in claim 2, wherein the soya curd is a fat containing curd.

4. A process as claimed in claim 2, wherein the soya curd contains from 5 to 25% by weight of insoluble constituents of the soya beans from which the curd is derived.

5. A process as claimed in claim 1, wherein the starting protein material is ground fish scraps.

6. A process as claimed in claim 1 wherein the starting protein material has a dry matter content of from 5 to 28% by weight.

7. A process as claimed in claim 1, wherein the starting protein material has a pH-value of from 4.5 to 9.

8. A process as claimed in claim 1, wherein the water in the protein material is exchanged for calcium ions by bringing the protein material into contact with a solution of calcium ions having an ionic strength of from 8 to 12 at a temperature in the range from ambient temperature to 60° C. over a period of from 1 to 24 hours.

9. A process as claimed in claim 8, wherein the solution of calcium ions is a $CaCl_2$ solution having a concentration of from 35 to 45% by weight.

10. A process as claimed in claim 1, wherein the water in the protein material is replaced by calcium ions by bringing the protein material into contact with a solution of calcium ions having a pH in the range from 4.5 to 9.

11. A process as claimed in claim 1, wherein the structured protein product obtained is washed with water to eliminate excess calcium.

12. A process as claimed in claim 1, wherein structuring is partly carried out by the osmotic force to form a peripheral structured membrane and in that structuring is completed by freezing.

13. A structured protein product when obtained by a process as claimed in claim 1.

14. A deep-frozen, dehydrated or preserved food product when produced from a structured protein product as claimed in claim 13.

* * * * *